US009174726B2

(12) United States Patent
Ushiyama et al.

(10) Patent No.: US 9,174,726 B2
(45) Date of Patent: Nov. 3, 2015

(54) DRIVING DEVICE FOR WHEEL OF AIRPLANE (75) Inventors: Izumi Ushiyama, Kawasaki (JP); Akihiko Tawara, Fuchu (JP)

(73) Assignee: Akihiko Tawara, Fuchu-shi, Tokyo (JP)

( * ) Notice: Subject to any disclaimer, the term of this patent is extended or adjusted under 35 U.S.C. 154(b) by 125 days.

(21) Appl. No.: 13/992,536

(22) PCT Filed: Feb. 4, 2011

(86) PCT No.: PCT/JP2011/052354
§ 371 (c)(1),
(2), (4) Date: Jun. 7, 2013

(87) PCT Pub. No.: WO2012/105037
PCT Pub. Date: Aug. 9, 2012

(65) Prior Publication Data
US 2013/0256452 A1    Oct. 3, 2013

(51) Int. Cl.
*B64C 25/40* (2006.01)
(52) U.S. Cl.
CPC ............... *B64C 25/405* (2013.01); *B64C 25/40* (2013.01)
(58) Field of Classification Search
CPC .......................... B64C 25/40; B60C 2200/02
USPC ....................................................... 244/103 S
See application file for complete search history.

(56) References Cited

U.S. PATENT DOCUMENTS

| 2,333,447 | A | * | 11/1943 | Schippel | 244/103 S |
| 2,370,316 | A | * | 2/1945 | Juul | 244/103 S |
| 2,377,638 | A | * | 6/1945 | Lueck | 244/103 S |
| 2,412,406 | A | | 12/1946 | Kerezi | |
| 2,418,064 | A | * | 3/1947 | Austin | 244/103 S |
| 2,435,801 | A | * | 2/1948 | Shively | 244/103 S |
| 2,439,033 | A | * | 4/1948 | Antonson | 244/103 S |
| 2,457,897 | A | * | 1/1949 | Hull et al. | 244/103 S |
| 2,457,899 | A | * | 1/1949 | Hursh | 244/103 S |
| 3,233,849 | A | * | 2/1966 | Rubin | 244/103 S |
| 3,741,503 | A | * | 6/1973 | Cabeza | 244/103 S |

(Continued)

FOREIGN PATENT DOCUMENTS

| JP | H01-160797 A | 6/1989 |
| JP | H05-178290 A | 7/1993 |
| JP | H08-254176 A | 10/1996 |

(Continued)

OTHER PUBLICATIONS

PCT, "International Search Report for PCT/JP2011/052354", Mar. 1, 2011.

*Primary Examiner* — Christopher P Ellis
*Assistant Examiner* — Richard G Davis
(74) *Attorney, Agent, or Firm* — Manabu Kanesaka (57) ABSTRACT A driving device for driving a wheel of an airplane in a direction same as that of a revolution of the wheel after landing, includes a revolution drive disc having a flat ring plate having an attachment portion adapted to attach on a side surface of a tire of the wheel; and a plurality of fins arranged on the ring plate. The plurality of fins is obliquely arranged on an outer side surface of the ring plate so that when the plurality of fins receives relative atmospheric air flow, a torque generated by the fins at a lower side of the tire in the direction same as that of the revolution of the wheel after landing is larger than a torque generated by the fins at an upper side of the tire in a direction reverse to that of the revolution of the wheel after landing.

15 Claims, 6 Drawing Sheets

(56) References Cited

U.S. PATENT DOCUMENTS 4,615,498 A * 10/1986 Ochiai ................. 244/103 S
5,213,285 A * 5/1993 Stanko ................. 244/103 S

FOREIGN PATENT DOCUMENTS

| JP | 2001-146199 A | 5/2001 |
| JP | 2004-203223 A | 7/2004 |

* cited by examiner

DRIVING DEVICE FOR WHEEL OF AIRPLANE

CROSS-REFERENCE TO RELATED APPLICATION

The present application is National Phase of International Application claiming priority from PCT Application No. PCT/JP2011/052354 filed on Feb. 4, 2011, the disclosure of which is incorporated herein.

FIELD OF THE INVENTION

This invention relates in general to a driving device for driving a wheel of an airplane, and more particularly, to a driving device for rotatably driving the wheel of an airplane in a direction same as the direction of the wheel after landing by utilizing the relative atmospheric air flow that the airplane receives before landing.

BACKGROUND OF THE ART

An airplane is provided with plural wheels under the body or wings for taking off, landing and parking. The wheels support the body so that the airplane can move on the runway. When taking off, by the thrust power of the engine, the airplane runs on the runway through the wheels with the speed gradually increasing, and soon the wheels are detached from the ground of the runway by the dynamic lift that the wings receive to lift the body. When the airplane lifts to a sufficient height, the wheels are enclosed within the body.

On the contrary, when landing, the wheels are drawn out with sufficient time before landing, and the airplane gradually reduces the altitude. After the wheels contact the runway, the airplane runs on the runway through the wheels which support the weight of the body, the speed of the airplane is gradually reduced, and the airplane comes to a halt.

Hereof, ordinary wheels of the airplane are rotatably supported by axles and not equipped with a driving apparatus. Accordingly, before landing, the wheels, which will support the weight of the body, are not rotating and are stagnant. On the contrary, at the instance when the airplane lands, bottom surfaces of the wheels receive a strong shock of force in the tangential direction from the front surface of the runway by the frictions between the tire of the wheels and the runway, and thus driving the wheels. Namely, the wheels of the airplane receive so much shock force that the number of revolutions of the wheel changes from zero to the value corresponding to the flight speed at the moment of landing. The flight speed at the landing of a passenger plane with jet engine is about 200~300 km/hour. The shock force, which brings the change of the revolution number of landing, erodes the tire of the wheel, and surface portion of the tire is stripped by the sliding resistance between the runway and the tire resulting in the generation of white smoke at landing. Further the remnant or residue of the tire sticks to form a layer on the landing point of the runway. The stuck remnant or residue layer must be removed periodically by the stripping apparatus from the runway. Hence the maintenance of the runway is very troublesome.

Japanese Patent Openings H5-178290, H8-254176, and 2001-146199 disclose wheel driving devices which drive the wheel in a direction same as the direction of the wheel after landing by utilizing the relative atmospheric air flow, to which the airplane receives before landing.

The device disclosed in the Japanese Patent Opening H5-178290 is to provide plural, for example, six, projections at the predetermined pitch on the side surface of the tire. This device makes the manufacture of the tire of airplane very difficult and increases the cost of the tire. Further, as the projections project in the axial direction of the tire, the normal torque by the projection at the lower side of the tire and the reverse torque by the projection at the upper side of the tire cancels each other. Accordingly, sufficient torque cannot be brought to the tire.

In the Japanese Patent Opening H8-254176 and Japanese Patent Opening 2001-146199, the grooves formed on the tires of the wheels of airplane are disclosed. That is, fins are formed in the longitudinal groove of the tire, or the shape of the groove on the tread of the tire is devised to form a wedge, causing the revolution of the wheel by the relative atmospheric air flow brought by the flight. But due to the structure of the grooves of the tire, sufficient thickness of the tread of the tire is required, resulting in the increase of the weight of the airplane. Further, when the tire is worn, the structures of the grooves generating the torque by the relative atmospheric air flow are also worn down or broken down, causing a failure of the revolution of the wheel. Further, the cost of the tire increases because the tire requires the groove of special structure.

PATENT REFERENCE No. 1: Japanese Patent Opening H5-178290
PATENT REFERENCE No. 2: Japanese Patent Opening H8-254176
PATENT REFERENCE No. 3: Japanese Patent Opening 2001-146199

SUMMARY OF THE INVENTION

Subject to be Solved by the Invention

An object of the present invention is to provide a driving device for driving wheels of an airplane before landing in a direction same as a direction of the rotation of the wheels after landing, through the conventional same wheel structure of the airplane.

Another object of this invention is to provide a driving device for driving a wheel of airplane in a same direction as a rotation of the wheel after landing, by attaching a previously prepared revolution drive member on a side surface of the tire.

Another object of this invention is to provide a driving device for driving a wheel of an airplane, wherein the revolution drive member does not detach or damage from the deformation of the tire at the moment of taking off or landing.

Another object of this invention is to provide a driving device for driving a wheel of an airplane, wherein the revolution drive member can be removed when required and be repeatedly used.

Another object of this invention is to provide a driving device for driving a wheel of an airplane, wherein the same revolution drive member is alternatively attachable on the both side surfaces of the tire.

The above and other objects and the feature of the present invention will be apparent from the technical sprit of the present invention and the embodiments of this invention which are described hereinafter.

Means to Solve the Subjects

In order to achieve the above described objects, there is provided a driving device for driving a wheel of an airplane in a direction same as the direction of the wheel after landing by utilizing relative atmospheric air flow that the airplane receives before landing, including a flat ring plate constituting attaching means to attach thereof on a side surface of the tire, a plurality of fins arranged on the ring plate at a predetermined pitch in a peripheral direction, the plurality of fins being obliquely arranged so that a torque generated by a part of the plurality of fins at a lower side of the tire in the direction same as the direction of the revolution of the wheel after landing is larger than a torque generated by a part of the plurality of fins at an upper side of the tire in a direction reverse to the direction of the revolution of the wheel after landing, and a revolution driving disc comprising the ring plate and the fins, wherein the ring plate is attached on the side surface of the tire.

Herein, the fins on the upper side of the side surface of the driving disc receive the relative air flow to close the fins, and the fins on the lower side of the side surface of the driving disc receive the relative air flow to open the fin. Further, the fins and the ring plate may be made as separate pieces, the base portions of the fins may be attached on the ring plate and a gap may be formed between a leading end portion of each of the fins and the ring plate so that the fin deforms to increase the gap between the leading end portion and the ring plate when the relative air flow is applied. Still further, the fins may be integrally formed on the ring plate, and the leading end portion of the fin may be thinner than the base portion which is integrally connected to the ring plate. The gap at the leading end portion side may be larger than the gap at the base side, so that the leading end portion of the fin deforms to separate from the ring plate when the air flow is applied. Still further, the base portion of the fin may be attached to the ring plate or may be integrally formed with the ring plate, and the gap may be formed between the leading end portion of the fin and the ring plate, while the configuration of the fin in the width direction may be curved.

Still further, the revolution drive disc may be made of rubber-based materials and is attached to the side surface of the tire through the rubber-based adhesive. Still further, the revolution drive disc may deform in accordance with the deformation of the tire. Still further, the central opening of the ring plate may be served for the attaching and the detaching of the wheel.

According to above mentioned present invention, by attaching the flat ring plate on the outer side surface of the tire through the adhesive means, the driving device for the wheel is assembled. By this arrangement, the torque generated by the fins at the lower side of the tire in the direction same as that of the revolution of the wheel after landing is larger than the torque generated by the fins at the upper side of the tire in the direction reverse to that of the revolution of the wheel after landing, and hence, prior to landing, the wheels are driven in the direction same as that of the revolution of the wheel after landing. That is, as the wheels rotate before landing in the direction same as the revolution of the wheel after landing, the change of the number of revolution at the moment of landing is reduced, and the erosion and damage to the tire of the wheel are mitigated at the instant of landing. Further, the remnant or the residue of the tire attaching on the surface of the runway is reduced. Accordingly, the maintenance of the runway becomes easy or unnecessary.

Also, according to another aspect of the invention, there is provided a driving device for driving a wheel of an airplane in a direction same as that of a revolution of the wheel after landing by utilizing relative atmospheric air flow that the airplane receives before landing, including;

a pair of flat ring plate arranged parallel to each other in an axial direction with a predetermined space therebetween and constitutes alternative attaching means to attach to a side surface of the tire, a plurality of fins arranged between the pair of ring plates in a peripheral direction at a predetermined pitch, the fins being obliquely disposed in a radial direction so that a rotational torque generated by a part of the plurality of fins at a lower side of the tire in the direction same as that of the rotation of the wheel after landing is larger than a rotational torque generated by an upper side of the tire in a direction reverse to the direction of the rotation of the wheel after landing, and a revolution drive disc including the pair of ring plates and the fins, wherein one of the pair of ring plates is attached to the side surface of the tire by the rubber-based adhesive.

Herein, the fins of the revolution driving disc at the upper side of the tire direct the air flow to the outside in the radial direction, and the fins at the lower side of the tire direct the air flow to a center of the wheel in the radial direction. Further, the revolution drive disc may be made of rubber-based material and is attached to the side surface of the tire through the rubber-based adhesive, for example nitrile rubber-based adhesive. The revolution driving disc may be symmetrically in the axial direction to left and right relative to the middle portion of the pair of ring plates. One of the pair of ring plates may selectively be adhered to each outer side surface of the tire. Further, the pair of ring plates may selectively be adhered to outer side surfaces of the tires of the double wheels.

According to the driving device, a driving device for driving the wheel of the airplane is assembled by attaching a revolution drive disc on the tire. By this arrangement, as same as the former device, the wheel can be driven in the direction same as that of the revolution of the wheel after landing, resulting in the prevention of the wear and damage to the tire and prevention of the sticking of remnants or residues on the surface of the runway. Further, as a pair of ring plates is arranged at the both end sides in the axial direction, one of the above ring plates may selectively be attached to the respective side surface of the tire through adhesive means. Accordingly, by one kind of driving disc, the driving disc may selectively be attached to outer side surfaces of the tire, or alternatively attached to the outer side surfaces of the tires which constitutes a double wheel. Hence, a single kind of revolution drive disc satisfies every need, and it is not necessary to prepare two kinds of revolution drive disc symmetrical to each other.

DESCRIPTION OF THE REFERENCE NUMERALS 11 leg
12 axle housing
15 wheel
16 wheel
17 tire
20 revolution drive disc
21 ring plate
22 fin
23 circular opening
25 base portion
26 curved concavity
30 revolution drive disc
31, 32 ring plate
33 fin
35, 36 circular opening

BEST MODE OF THE EMBODIMENT

Figure 1:
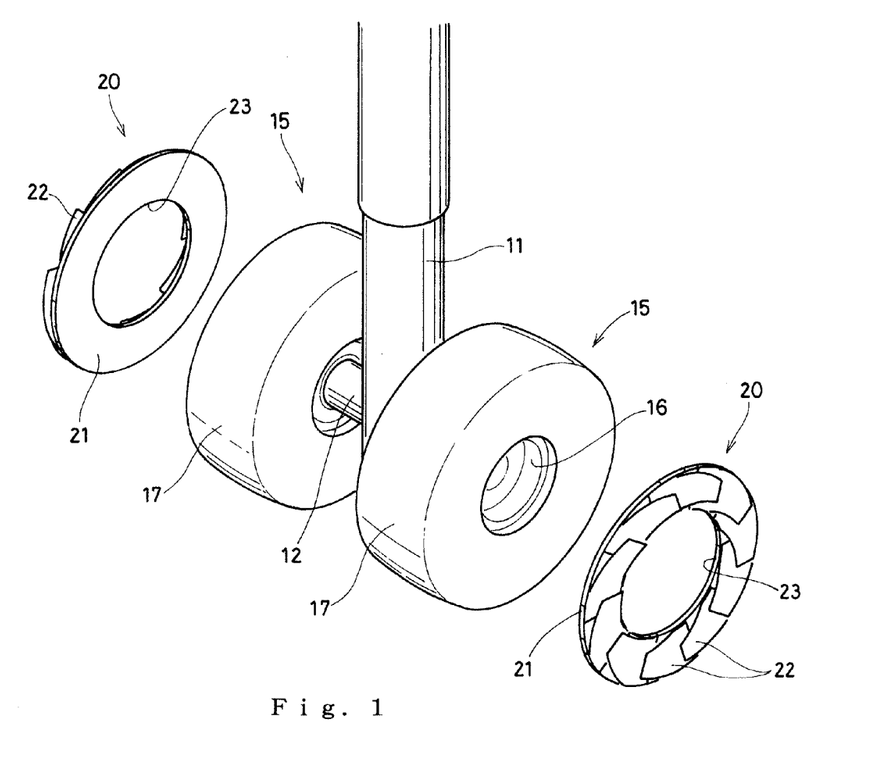
FIG. 1 is an exploded perspective view of a wheel of the airplane according to the first embodiment of this invention.
Figure 2:
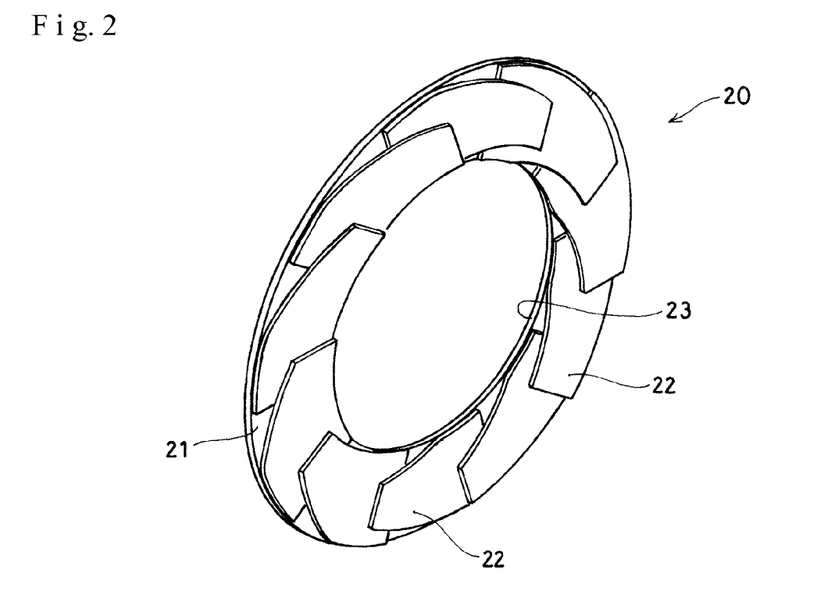
FIG. 2 is a perspective view of the revolution drive wheel attached to the wheel.

Now below, the present invention will be described referring to the drawings. FIG. 1 shows a wheel of an airplane of the first embodiment. A leg is receivably supported on the lower side of the body so that the leg 11 projects downwardly. FIG. 1 shows a leg 11 which is drawn downward. At the bottom portion of the leg 11, a pair of axle housings projects horizontally in the right and left, and the leg 11 and the pair of axle housings comprises a reverse "T" letter structure. At both ends of the axle housings 12, wheels 15 are installed respectively. The wheel 15 comprises a wheel frame and a tire 17. The wheel frame 16 is rotatably supported on the axle housing 12 through bearings.

The feature of the wheels of this embodiment is revolution drive discs 20 which are attached to the side surfaces of the both sides of the tire 17. The revolution drive disc 20 comprises a ring plate made of the rubber-based material same as the material of the tire, and a plurality of fins 22 arranged at the predetermined pitch in a peripheral direction on the outer side surface of the ring plate 21. A circular opening 23 is formed on the center of the ring plate 21. The circular opening 23 is used to install or to detach the wheel.

The fin 22 may integrally be formed on the ring plate 21, or the fin 22 may be made independently from the ring plate 21 and attached on the ring plate 21 at the predetermined pitch in the peripheral direction.

The fins 22 serve to rotate the wheel 15 through the relative atmospheric air flow before landing in the direction same as that of the revolution of the wheel 15 after landing. The fins are obliquely arranged on the ring plate 21 so that the fins 22 at the upper side of the tire 17 receive air flow to close the fins 22 and the fins 22 at the lower side of the tire 17 receive air flow to open the fins 22 through the relative atmospheric air flow before landing.

Figure 4:
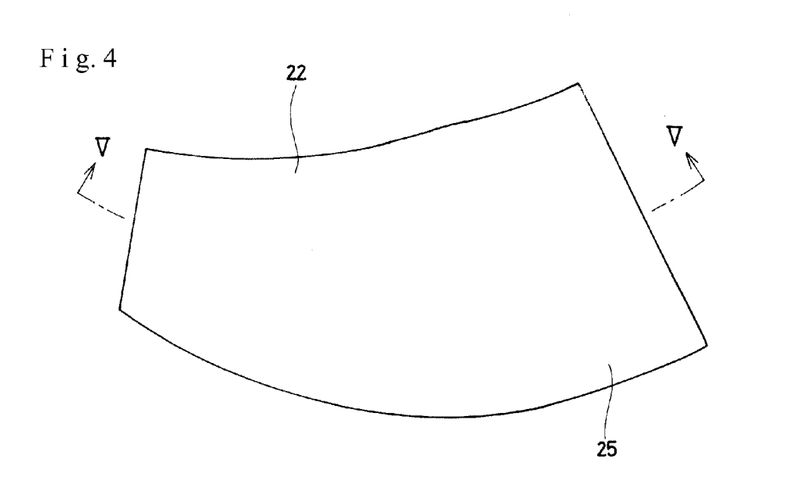
FIG. 4 is a plan view of the fin arranged on the revolution drive disc.
Figure 5:
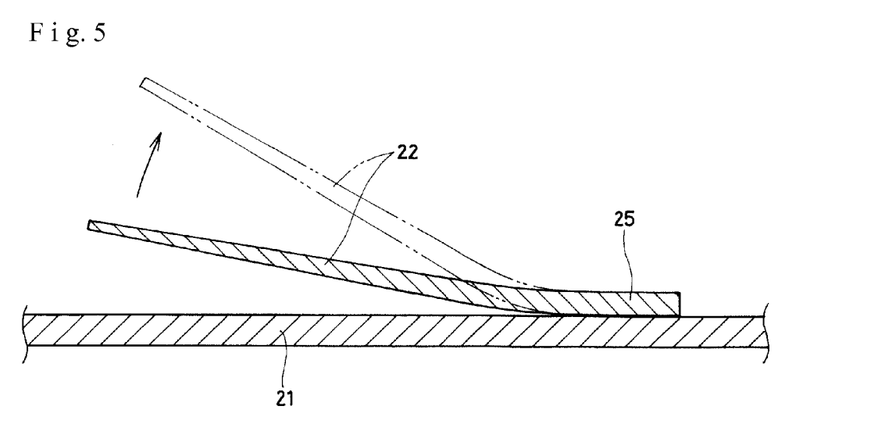
FIG. 5 is a cross sectional view of the fin along the peripheral direction and cross indicating line in FIG. 4 showing the attachment of the fin to the ring plate.

FIG. 4 shows a plan view of the fin 22 which is arranged on the ring plate 21 in the peripheral direction at the predetermined pitch to assemble the rotation drive disc 20. The fin 22 is made of the rubber-based material same as the ring plate 22, and is formed separately from the ring plate 21. The base portion 25 of the fin 22 is thicker than the leading end portion of the fin 22, and the thickness of the fin 22 is gradually reduced toward the leading end portion. The base portion 25 of the fin 22 is attached to the surface of the ring plate 21 by adhesion as shown in FIG. 5. When a support arm of the wheel extends outside of the wheel, a ring plate which is cut at the predetermined portion in the peripheral direction may preferably be used. An adhesion of the fin 22 to the ring plate 21 is accomplished by the rubber-based adhesive, for example nitrile rubber-based adhesive. The inner surface of the base portion of the fin 22 is attached to the ring plate 21. On the contrary, the leading end portion of the fin 22 is separated from the ring plate 21. The cross sectional configurations of the fin 22 and the ring plate 21 are "V" letter shaped. The gap between the fin 22 and the ring plate 21 is gradually increased along the longitudinal direction toward the leading end portion. Hence, the fin 22 deforms to project toward the side as shown in chain-dot line in FIG. 5 when the fin 22 receives air flow wind and causes strong resistance force, thus applying a torque on the wheel 15.

Figure 6:
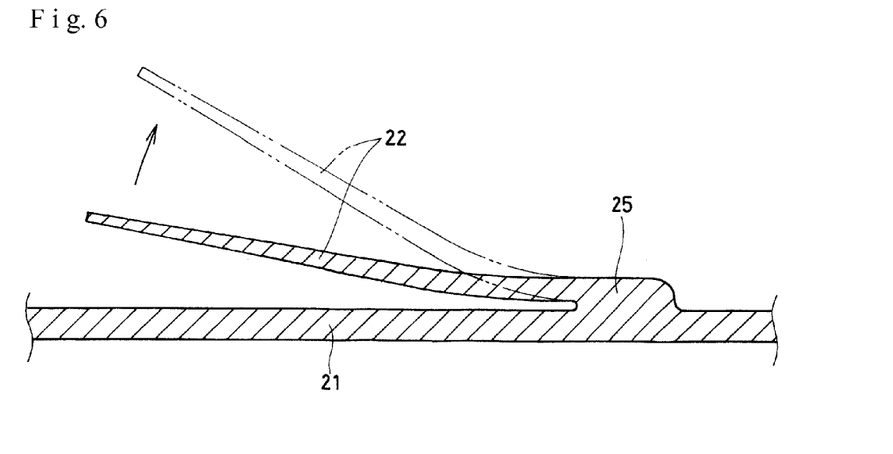
FIG. 6 is a cross sectional view of the fin along the peripheral direction, in which the fins are integrally formed on the ring plate.

A fin 22 shown in FIG. 6 is integrally formed with the ring plate 21. The base portion of the fin 22 is integrally connected to the ring plate 21. The thickness of the fin 21 is large at the base portion and is small at the leading end portion, the thickness gradually reducing toward the leading end portion. Further, a gap of the fin 22 relative to the ring plate 21 at the leading end portion is larger than that at the base portion, the gap gradually increasing. The fin 22 deforms so as to project outwardly as shown in chain-dot line in FIG. 6 when receiving the atmospheric air flow wind. By the wind, the fin 22 receives a strong resistance to drive the wheel 15 through the revolution drive disc 20.

Figure 7:
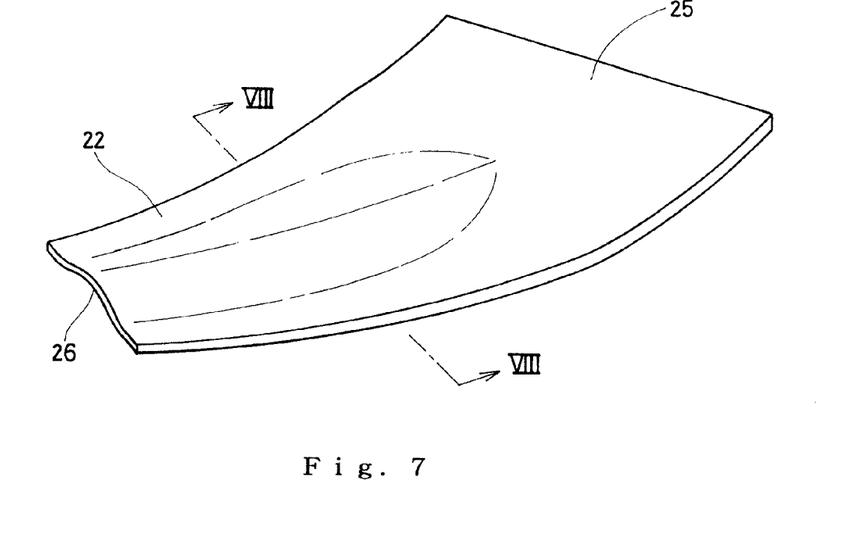
FIG. 7 is a perspective view of the fin according to another embodiment.
Figure 8:
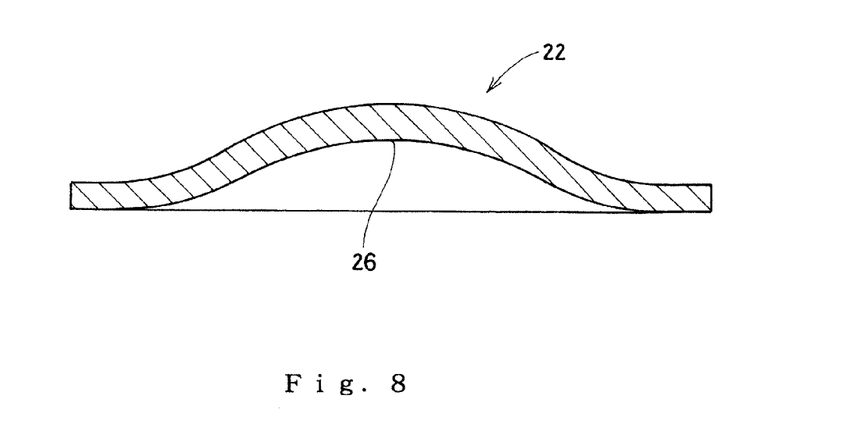
FIG. 8 is a cross sectional view of the fin along the width direction and cross indicating line in FIG. 7.

Next, a fin 22 having a different structure will now be described with reference to FIGS. 7 and 8. The fin 22 may be made separately from the ring plate 21, and adhered to the ring plate 21 at the base portion 25 through the rubber-based adhesive. Alternatively, the fin 22 may integrally be formed with the ring plate 21. The feature of the fin 22 is that the fin 22 has a round curved, configuration in the width direction of the fin 22 and in the radial direction of the ring plate 21. At the leading end side displaced from the integrally connected or adhered base portion, the fin 22 is curved to form a curved concavity 26 by which the bottom side is concaved, and the concavity 26 is continuous until the leading end portion of the fin 22. Accordingly, the fin 22 easily receives the relative atmospheric air flow and it makes easy to deform outwardly.

Figure 3:
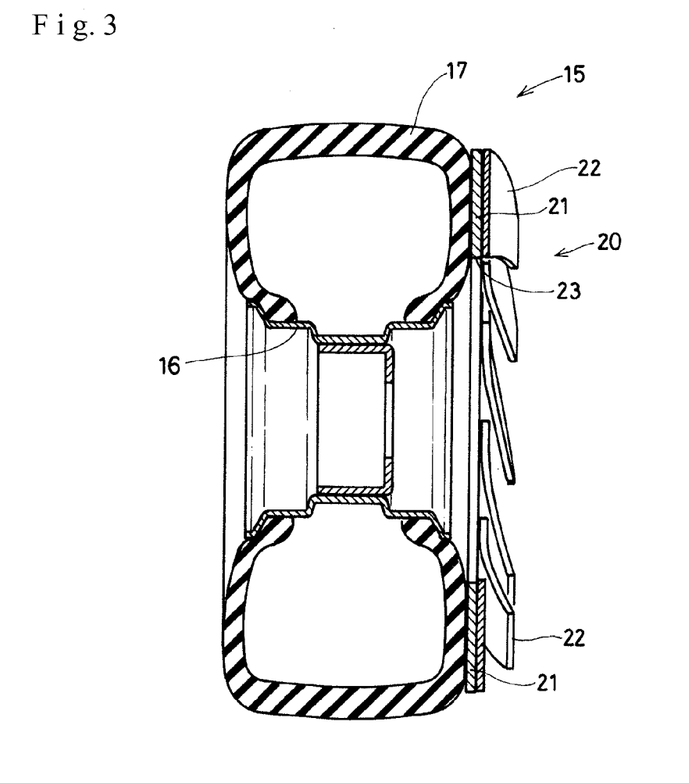
FIG. 3 is a longitudinal sectional view of the wheel on which the revolution drive disc is attached.

Next, the operation of the wheel driving device utilizing the rotation drive disc 20 will now be described. A rotation drive disc 20 is previously prepared. The rotation drive disc 20 has a ring plate 20 on which a plurality of fins 22 is arranged in the peripheral direction at the predetermined pitch. The rotation drive disc is made from the rubber-based material as same as the tire 17, as mentioned above. The rotational drive disc 20 is adhered to the side surface of the tire 17 as shown in FIG. 3. Adhesion is achieved through the nitrile rubber-based adhesive. The reverse surface on which fins are not attached on the ring plate 21 is adhered to the outer side surface of the tire 17. When the wheel 15 is double wheels as shown in FIG. 1, the rotation drive discs 20 are attached to the opposite sides of the both wheels 15. Herein, as the right and left revolution drive discs 20 are symmetrical to each other in the axial direction, the revolution drive disc 20 at the right and that at the left are symmetrical to each other. That is, in here, right-side disc 20 and the left-side disc 20 are independently prepared, and are adhered to respective surfaces of the tires 17 of the wheels 15.

When the revolution drive disc 20 is attached to the wheel 15, the fin 22 at the lower side of the tire 17 opens by the relative atmospheric air flow due to the flight before landing, and a torque is generated to drive the tire 17 in the direction same as the revolution of the wheel 15 after landing. The fin 22 at the upper side of the tire is closed by the relative atmospheric air flow due to the flight, and does not generate the torque in the direction reverse to the revolution of the wheel after landing.

As mentioned above, according to this embodiment, the wheel 15 is driven to rotate in the direction same as that of the revolution of the wheel 15 after landing by the elastic deformation of the fin 22 of the revolution drive disc 20. Therefore, the wheel 15 is driven before landing in the direction same as the revolution of the wheel 15 after landing. Hence the change of the number of revolution at the moment of landing is reduced or gone. Accordingly, the shock and the damage of the tire 17 due to the impact against the runway are prevented. Further, a phenomenon that the surface of the tread of the tire 17 attaching to the runway is prevented or mitigated. Therefore, an abrasion and damage to the tire 17 is prevented, and the life of the tire are extended. Furthermore, the maintenance of the runway is mitigated or become unnecessary.

Figure 9:
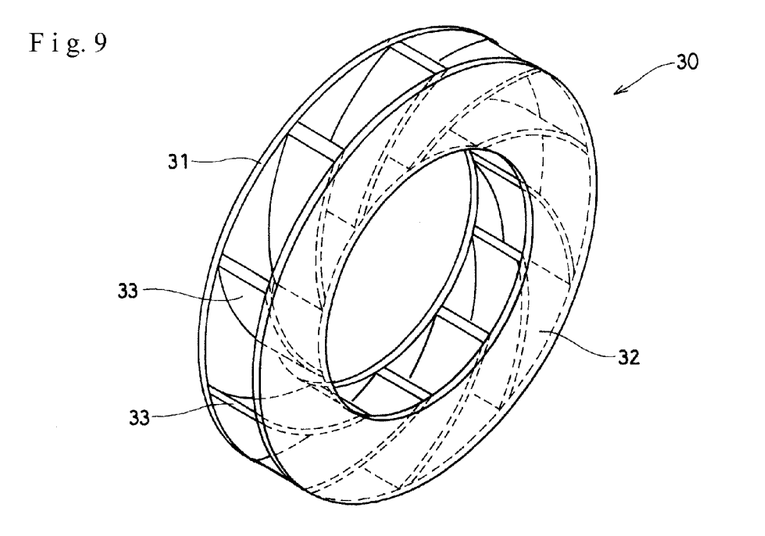
FIG. 9 is a perspective view of the revolution drive disc according to the second embodiment of this invention.
Figure 10A:
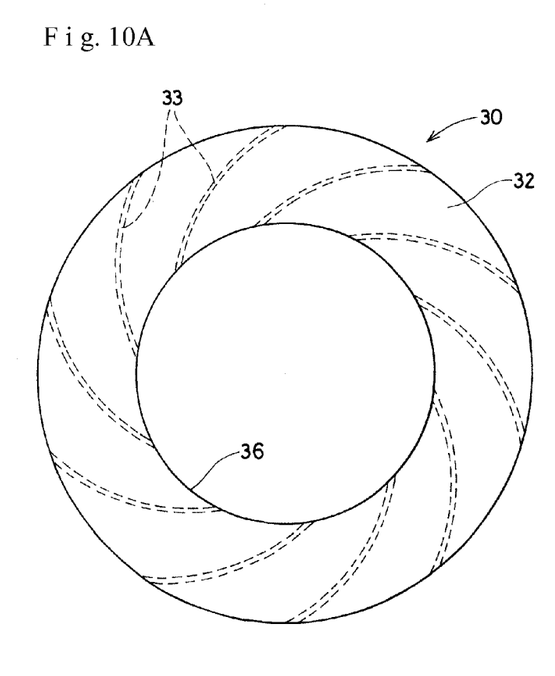
FIG. 10A is a front view and FIG. 10B is the longitudinal sectional view of the revolution drive disc shown in FIG. 9.
Figure 10B:
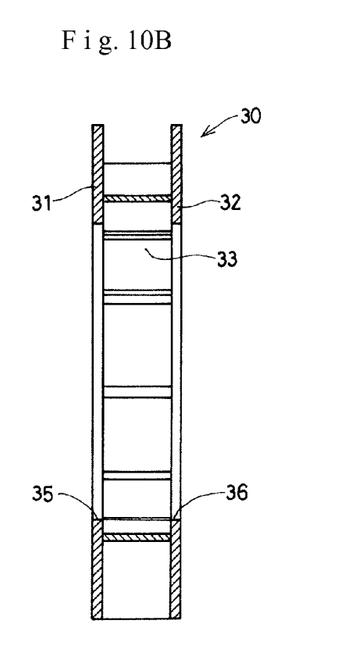

Next, another embodiment of this invention will be described with reference to FIG. 9 and FIG. 10. In this embodiment, a pair of ring plates 31, 32 having a same shape to each other is assembled to form a revolution drive disc 30. The ring plates 31 and 32 are arranged side by side to each other in the axial direction at the predetermined space. In the space, a plurality of fins 33 shown in FIG. 9 and FIG. 10 is arranged at the predetermined pitch in the peripheral direction. Circular openings 36 are formed at the center of the ring plates 31, 32. These openings 36 serve to equip or to exchange the wheel 15.

In this arrangement of the revolution drive disc, the plurality of fins 33 arranged between a pair of ring plates 31, 32 is formed so that the fins at the upper side of the tire 17 are curved to direct the relative atmospheric air flow due to the flight before landing outwardly in the radial direction, and the fins 33 at the lower side of the tire 17 are curved to direct the relative atmospheric air flow due to the flight before landing inwardly to the center in the radial direction. Therefore, the torque generated by the lower side fin 33 in the direction same as that of the revolution of the wheel 15 after landing due to the atmospheric air flow of the flight before landing is larger than the torque generated by the upper side fin 33 in the direction reverse to that of the revolution of the wheel after landing. Accordingly, prior to landing, it is possible to drive the wheel 15 in the direction same as that of the revolution of the wheel after landing. Therefore, the change of the number of the revolutions at the moment of landing is reduced or gone. Accordingly, the shock and the damage to the tire 17 on landing are reduced, and by this arrangement, the effects same as that of the first embodiment is accomplished.

Figure 11:
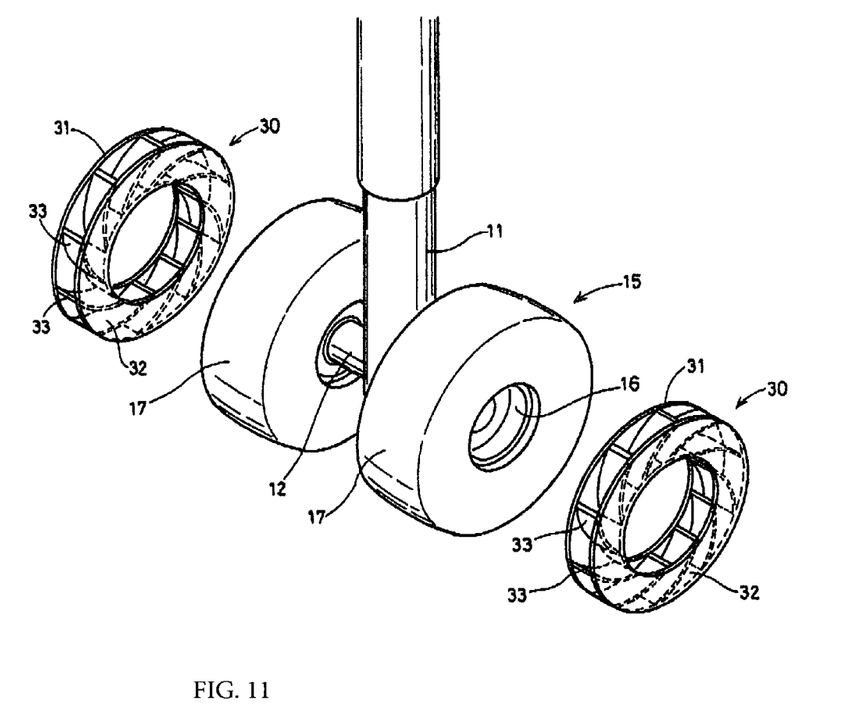
FIG. 11 is an exploded perspective view of a wheel of the airplane according to the second embodiment of this invention.

Moreover the revolution drive disc 30 according to this embodiment, has ring plates 31, 32 provided on both sides, the shape of the left and right sides of the ring plate are symmetrical to each other relative to the intermediate point in the axial direction as shown in FIG. 10B. Hence, the ring plates 31 and 32 can be selectively or alternatively attached to both side surfaces of the tire 17, when the revolution drive disc 30 is attached to each side of the wheel 15. Namely, the same single kind of revolution drive disc 30 can be attached to each side of the tire 17. Furthermore, the same single kind of revolution drive disc 30 can be attached to each of the outer side surfaces of double wheel 15 as shown in FIG. 11 by attaching the ring plates 31, 32 selectively. Therefore, it is not necessary to prepare a pair of two kinds of revolution discs 30 symmetrical to each other, and hence the management of the revolution drive disc 30 is easy.

And such revolution drive disc 30 includes the ring plates 31, 32 and the fin 33, which are all made of rubber-based material. Further, such a revolution drive disc 30 is attached to the outer side surface of the tire 17 using the rubber-based adhesive, for example nitrile rubber-based adhesive. Accordingly, the revolution drive disc 30 deforms with the tire 17, preventing the detachment of the revolution drive disc 30 from the tire 17. Moreover, the revolution drive disc 30 can repeatedly be used by detaching the disc from the worn out tire 17 and then reattaching to the new tire. Also, the fins 33 do not flap, interference is prevented, and safety is high because the fins 33 are not exposed to the outside portion.

Although the present invention is described by the embodiments with reference to the drawings, the present invention is not limited to the above embodiments, and the various modifications are possible within the scope and spirit of the present invention. For example, various design changes for the number and shape of the fins in the above mentioned embodiments are possible. Further, various materials may be selected for the rubber-based materials or adhesive of the rubber to manufacture the revolution drive disc, in accordance with the characteristic feature of the tire of the wheel to be attached.

INDUSTRIAL UTILIZATION OF THE INVENTION

Thus, the revolution drive disc 30 of wheel 15 of the airplane according to the present invention, drives the wheel in the same direction as the direction of the wheel after landing, by utilizing the relative atmospheric air flow due to the flight before landing, thus preventing wear or damage to the tire and, preventing the adhesion of the rubber residues or remnants on the surface of the runway.

What is claimed is:

1. A driving device for driving a wheel of an airplane in a direction same as that of a revolution of the wheel after landing, comprising a revolution drive disc including:
    a flat ring plate extending along a whole periphery of the wheel and having an attachment portion adapted to attach on a side surface of the wheel, the ring plate being formed from rubber-based material; and
    a plurality of fins formed from rubber-based material and arranged on the ring plate at a predetermined pitch in a peripheral direction of the ring plate, the plurality of fins being obliquely arranged on an outer side surface of the ring plate so that when the plurality of fins receives relative atmospheric air flow, a torque generated by a part of the plurality of fins at a lower side of the tire in the direction same as that of the revolution of the wheel after landing is larger than a torque generated by a part of the plurality of fins at an upper side of the tire in a direction reverse to that of the revolution of the wheel after landing,
    wherein the ring plate is arranged to attach to the side surface of the wheel so that the revolution drive disc deforms in accordance with a deformation of the tire.

2. A driving device according to claim 1, wherein the fins at the upper side of the tire receive force to close the fins by the atmospheric air flow due to a flight before landing, and the fins at the lower side of the tire receive to open the fins by the atmospheric air flow due to the flight before landing.

3. A driving device according to claim 2, wherein the fin is formed integrally on the ring plate, a thickness of the fin at a base portion is larger than that at a leading end portion, and a gap between the fin and the ring plate is gradually increased so that the fin deforms when receiving the relative atmospheric air flow so that the leading end portion of the fin is separated from the ring plate.

4. A driving device according to claim 2, wherein an inner surface of a base portion of the fin is adhered to or the fin is integrally formed on the ring plate, and
 a gap is formed between an inner surface of a leading end portion side of the fin and the ring plate, an intermediate portion of the fin in a width direction projecting outwardly to form a curve in the width direction of the fin.

5. A driving device according to claim 1, wherein the fins are formed independently from the ring plate, an inner surface of a base portion of the fin is adhered to the ring plate, and a leading end portion of the fin separates from the ring plate so that the fin deforms to enlarge a gap between the fin and the ring plate.

6. A driving device according to claim 1, wherein a circular opening is formed at a center of the ring plate for attachment or removal of the wheel.

7. A driving device according to claim 6, wherein each fin of the plurality of fins comprises:
 a base portion arranged at one end of the fin and connected to the ring plate, the base portion having a width equal to that of the ring plate between an outer edge thereof and an edge of the circular opening, and
 a leading end portion arranged at another end of the fin opposite to the base portion and away from the ring plate to receive the relative atmospheric air flow, the leading end portion having a width less than that of the base portion,
 wherein the fin has a thickness greatest at the base portion and gradually decreasing toward the leading end portion so that a gap formed between the fin and the ring plate gradually increases from the base portion toward the leading end portion, and the fin has a shape extending along a circumference of the ring plate, and
 the plurality of fins is arranged to receive the relative atmospheric air flow to rotate the revolution drive disc, so that when the revolution drive disc rotates, the fins of the plurality of fins at the upper side of the tire deform to close and the fins of the plurality of fins at the lower side of the tire deform to open.

8. A driving device according to claim 7, wherein the leading end portion of each fin of the plurality of fins overlaps the base portion of the adjacent fin of the plurality of fins.

9. A driving device according to claim 1, wherein each fin of the plurality of fins further comprises:
 a base portion arranged at one end of the fin and connected to the ring plate, the base portion having a width equal to that of the ring plate between an outer edge thereof and an edge of the circular opening,
 a leading end portion arranged at another end of the fin opposite to the base portion and away from the ring plate to receive the relative atmospheric air flow, the leading end portion having a width less than that of the base portion, and
 a curved concavity formed on a surface of the fin adjacent to the ring plate, the curved concavity extending between the base portion and the leading end portion and protruding away from the ring plate so that the fin deforms outwardly to receive the relative atmospheric air flow.

10. A driving device for driving a wheel of an airplane in a direction same as that of a revolution of the wheel after landing, comprising a revolution drive disc including:
 a pair of flat ring plates formed from rubber-based material and arranged parallel to each other in an axial direction of the drive disc with a predetermined space inbetween, the pair of ring plates extending along a whole periphery of the wheel and having an attaching portion adapted to attach to an outer side surface of the wheel, and
 a plurality of fins formed from rubber-based material and arranged between the pair of ring plates in a peripheral direction of the pair of ring plates at a predetermined pitch, the fins being obliquely disposed in a radial direction of the revolution drive disc so that when the plurality of fins receives relative atmospheric air flow, a rotational torque generated by a part of the plurality of fins at a lower side of the tire in the direction same as that of the revolution of the wheel after landing is larger than a rotational torque generated by a part of the plurality of fins at an upper side of the tire in a direction reverse to that of the revolution of the wheel after landing,
 wherein one of the pair of ring plates is applied with a rubber-based adhesive to attach to the outer side surface of the wheel so that at least one of the pair of ring plates is arranged to deform in response to a deformation of the wheel.

11. A driving device according to claim 10, wherein the fins of the revolution drive disc at the upper side of the wheel direct the air flow to outside in the radial direction, and the fins at the lower side of the wheel direct the air flow to a center of the wheel in the radial direction.

12. A driving device according to claim 10, wherein the revolution drive disc is symmetrical in the axial direction relative to an intermediate portion of the pair of ring plates.

13. A driving device according to claim 10, further comprising another revolution drive disc having a structure same as that of the revolution drive disc,
 wherein the revolution drive disc is adapted to attach to the outer side surface of the wheel, and
 said another revolution drive disc is adapted to attach to another outer side surface of the tire opposite to said one outer side surface of the wheel.

14. A driving device according to claim 10, further comprising another revolution drive disc adapted to attach to an outer side surface of another wheel of double wheels.

15. A driving device according to claim 10, wherein the plurality of fins is arranged to allow the air flow to flow through a center of the revolution drive disc from one side to another side in the radial direction.

\* \* \* \* \*